United States Patent [11] 3,545,770

| [72] | Inventor | Edward A. Wheelock |
| | | Lake Zurich, Illinois |
| [21] | Appl. No. | 655,052 |
| [22] | Filed | July 21, 1967 |
| [45] | Patented | Dec. 8, 1970 |
| [73] | Assignee | Crane Packing Company |
| | | Morton Grove, Illinois |
| | | a corporation of Illinois |

[54] SEAL FOR GUN PORT
5 Claims, 10 Drawing Figs.

[52] U.S. Cl............................................. 277/152,
  277/157, 277/237, 89/36, 160/40, 49/489
[51] Int. Cl............................................... F16k 41/00
[50] Field of Search.......................................... 277/152,
  153, 157, 159, (MD), 237; 89/36, 36.4, 36.52,
  37(K); 160/40; 49/475, 489

[56] References Cited
UNITED STATES PATENTS
2,644,804  7/1953  Rubin............................. 277/(MD)UX

| 2,798,005 | 7/1957 | Love | 277/(MD)UX |
| 2,867,462 | 1/1959 | Nielsen | 277/152 |
| 2,932,535 | 4/1960 | Peickii et al. | 277/152X |
| 2,964,424 | 12/1960 | Mast | 277/(MD)UX |
| 3,023,804 | 3/1962 | Howell, Sr. | 160/40 |
| 3,091,994 | 6/1963 | Segerberg | 89/36 |
| 3,370,507 | 2/1968 | Fammler et al. | 89/36 |

FOREIGN PATENTS
| 1,485,274 | 5/1967 | France | 89/37(K) |
| 928,749 | 7/1963 | Great Britain | 277/MD |

Primary Examiner—Laverne D. Geiger
Assistant Examiner—Jeffrey S. Mednick
Attorney—Charles F. Voytech ABSTRACT: An endless lip seal of molybdenum disulphide filled polyurethane attached to the continuous edge of a gun port in a gun turret and pressed by finger springs upon a molybdenum disulphide filled polytetrafluoroethylene sheet secured to the gun shield. The lip cross section varies in accordance with the direction of relative movement between the lip and the sheet against which it bears to avoid grooving the sheet.

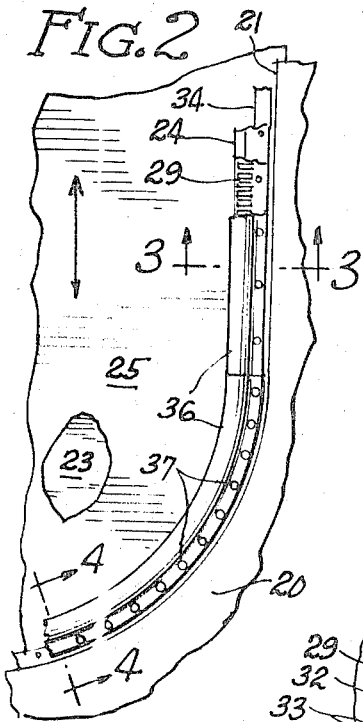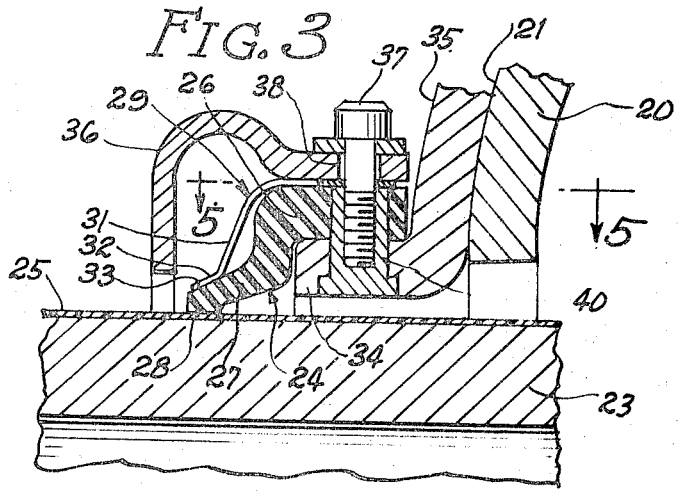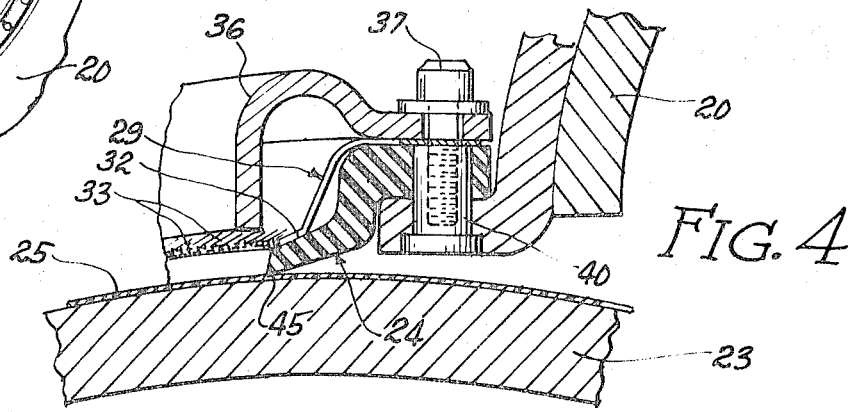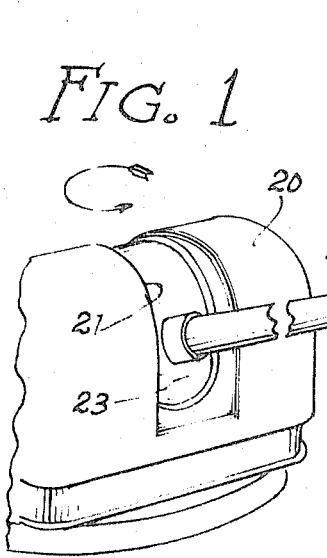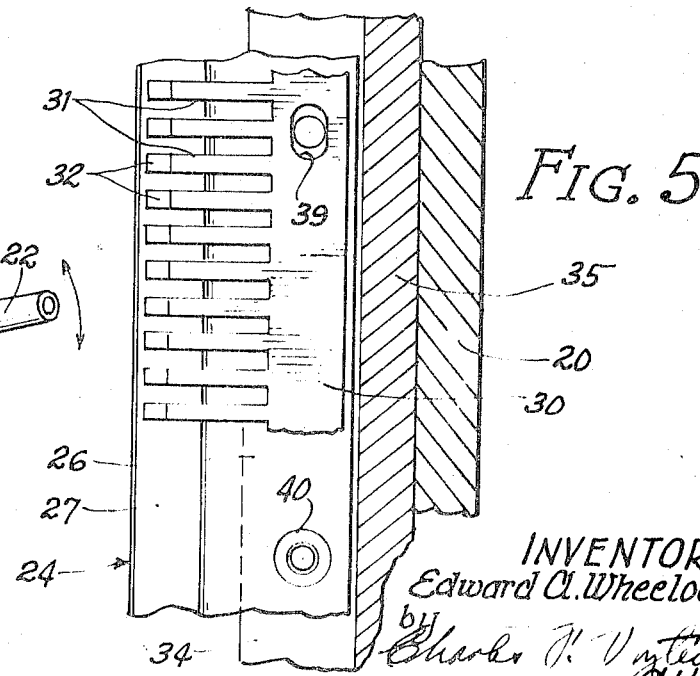

SEAL FOR GUN PORT

BACKGROUND OF THE INVENTION

This invention relates to lip seals for use in sealing the gun port of a gun turret.

Gun turrets of naval vessels are comprised of a hollow armoured shell provided with a vertically oriented port through which the gun protrudes. The gun mount is movable in a vertical direction to elevate or depress the gun while the armoured shell is rotatable about a vertical pivot to provide horizontal movement for the gun mount. The turrets are exposed to salt water which is very corrosive, and to prevent entry of the water between the turret and gun mount a seal has been provided around the edge of the port to bear against a cylindrical surface on the gun mount. This seal was generally made of felt or the like and was ineffectual to exclude water from the interior of the turret. This necessitated making the turret out of corrosion resistant material which, taking into consideration the thickness of the turret material necessary to provide adequate armour, was extremely expensive.

SUMMARY OF INVENTION

The principal object of this invention is to provide a lip seal for the gun port of a gun turret to bear against a gun shield which is movable relative thereto and effectively exclude water from the interior of the turret.

More specifically, this invention seeks to provide a simple endless seal of the lip type between relatively slidable surfaces wherein over one area the direction of relative movement is at right angles to the general disposition of the lip and over another or other areas the direction of relative movement is parallel to the general disposition of the lip, the shape of the endless lip being different over said areas to provide equal wear of the lip and the surface contacted thereby over the entire length of the lip.

It has also been found that the felt, leather or the like, generally used for this application of seal does not possess sufficient life compared with other seal applications and it is accordingly a further object of this invention to provide a combination of materials for the lip and relatively sliding surface which will provide a life for the seal comparable to that expected in other seal applications.

These and other objects of this invention will become apparent from the following detailed description when taken together with the accompanying drawings.

BRIEF DESCRIPTION OF DRAWINGS

FIG. 1 is a perspective view of a gun turret showing a gun port for which the seal of this invention is particularly adapted.

FIG. 2 is an enlarged fragmentary front elevational view of the lower right-hand portion of the gun port and seal of FIG. 1.

FIGS. 3 and 4 are enlarged cross-sectional views of different portions of the seal taken along lines 3-3 and 4-4 respectively, of FIG. 2 and looking in the direction of the arrows at the ends thereof.

FIG. 5 is a plan view of a fragment of the seal taken along line 5-5 and looking in the direction of the arrows at the end thereof to show the construction of the spring.

DESCRIPTION OF PREFERRED EMBODIMENT

Figure 6:
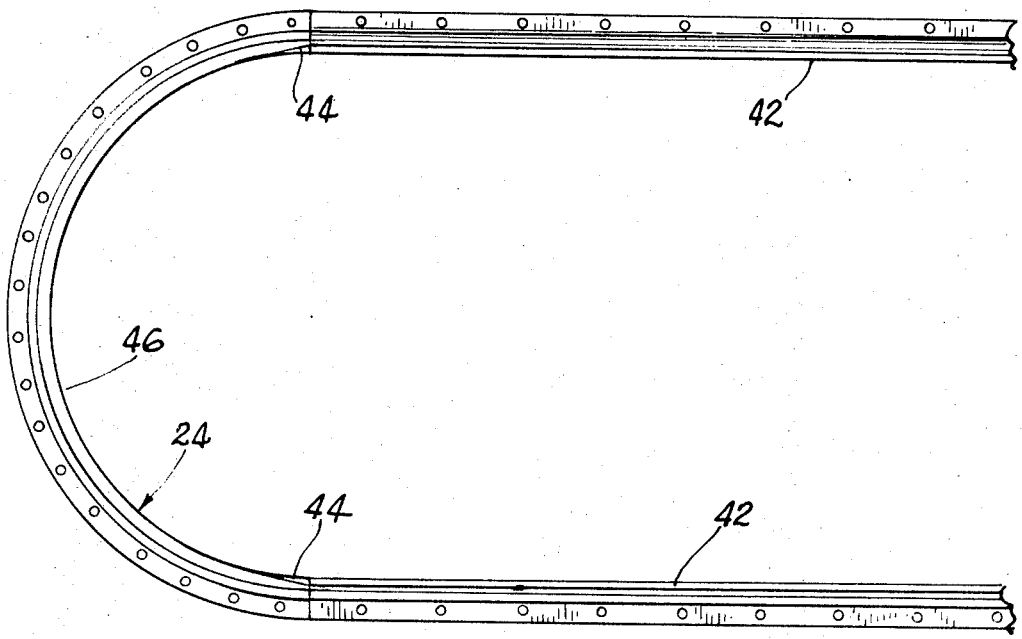
FIG. 6 is a fragmentary plan view of the lip portion of the seal.

The application selected to illustrate this invention is a gun turret for a naval vessel such as is shown in FIG. 1. The turret itself is comprised of a heavily armoured chamber 20 mounted on a swivel for rotation about a vertical axis. The chamber has an opening or port 21 through which extends a gun 22. An armoured shield 23 surrounds the inner end of the gun and acts as a closure for the port. The shield 23 rotates about a horizontal axis with gun 20 as the latter is elevated or lowered.

It is imperative that the chamber 20 be sealed against entry of water, dust and dirt, and this requires that the shield 23 be sealed with respect to port 21, giving rise to the problem solved by the present invention.

Referring now to FIG. 2, the seal of this invention is comprised of an endless flexible sealing lip 24 which bears against a sheet 25 cemented or otherwise fixed to shield 23 and is appropriately secured to the turret at the edge of the gun port 21. It has been found that the materials for the seal and shield previously used were unsuited for the conditions encountered, both as to temperatures and fluids, and a number of other combinations of materials were also tried without success. The only combination I have found to be successful is polytetrafluoroethylene is which has been dispersed molybdenum disulphide, for the sheet covering the shield, and molded polyurethane similarly filled with molybdenum disulphide. The sheet is preferably approximately 0.030 inch thick and is cemented to the metal shield. Since gun ports are quite large, the sheet may well be in excess of three feet wise and 15 feet long. The surface of the shield is cylindrical and hence the outer surface of the sheet is likewise cylindrical.

The lip 24 is shown in greater detail in FIG. 3. In its assembled form, it is an endless flexible strip having a flat attaching flange 26 and a downwardly and then outwardly extending tapered flexible lip 27 having an end 28 adapted to contact sheet 25 to form a fluid-tight seal therewith. The natural resilience of the polyurethane from which the lip is made is supplemented by spring 29 made of corrosion resistant metal such as monel metal, phosphor bronze, stainless steel, or the like. Said spring 29 is preferably stamped from a sheet of the metal and, as shown more clearly in FIG. 5, resembles a comb having a solid flat land 30 overlying the attaching flange 26 of lip 24, and outwardly and downwardly bent fingers 31, each of which terminates in a flat region 32 which bears against the outer correspondingly flat surface 33 of end 28 of lip 24 to hold said end 28 against sheet 25 with sealing pressure.

Attaching flange 26 is mounted upon a rigid metal flange 34 extending into port 21 above sheet 25 and preferably formed from a shaped angle iron having a leg 35 contoured to lie against the inner surface of port 21 to which it is welded with a fluid-tight joint. A guard 36 of heavy gauge metal is placed over spring 29, said guard contacting land 30 thereof and held tightly thereagainst by screws 37 which pass through aligned openings 38 and 39 in the guard and spring (FIG. 5) respectively, and into a threaded shouldered sleeve 40 which extends upwardly through flange 34 and the attaching flange 26 of lip 24. Tightening of screw 37 in sleeve 40 compresses guard 36, land 30 of spring 29 and attaching flange 26 against flange 34 to provide the desired fluid-tight seal between lip 24 and flange 34 and at the same time to provide downward pressure upon flat region 32 of finger springs 31 to hold the end 28 of the lip 24 against sheet 25. It will be understood that spring fingers 31 in their free state shaped with less slant between land 30 and flat end portions 32 so that when clamping pressure is exerted upon land 30, the fingers are resiliently distorted.

From FIGS. 1 and 2, it may be seen that the direction of relative movement between sheet 25 and lip 24 at section 3-3 is parallel to the lip end 28 and at section 4-4 is generally across said lip. Thus sheet 25 has the lip moving constantly over a very small area of the sheet at section 3-3, whereas at section 4-4, the lip moves over a large area of the sheet. This introduces a difference in the rate of wear of the sheet as between these two points inasmuch as at section 3-3 the lip reciprocates over a narrow region of the sheet and hence acts as a saw to cut into the sheet, while at section 4-4, the lip reciprocates broadside over a wide region of the sheet and hence acts as a squeegee to wipe the sheet.

To equalize the wear of the lip over the sheet, the shape of the lip at its point of contact with the sheet has been varied to present a broad surface to the sheet at section 3-3, a narrow surface at section 4-4, and a transitional tapered surface between the two sections. The broad surface at section 3-3 reduces the unit pressure exerted by the lip upon the sheet without impairing the ability of the lip to provide an effective seal and in this manner reduces the wear of the sheet by the lip.

Figure 7:
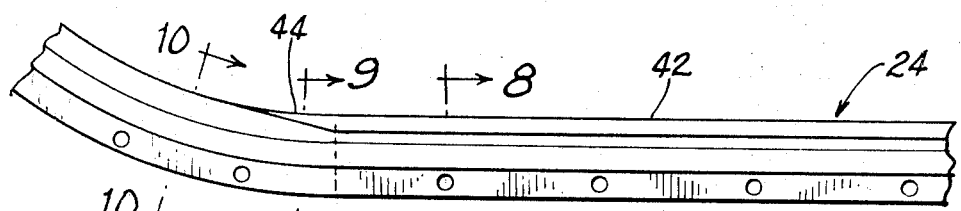
FIG. 7 is an enlarged fragment of the lip of FIG. 6.
Figure 10:
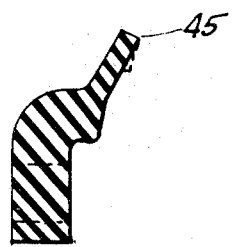
FIGS. 8, 9 and 10 are enlarged sections along lines 8-8, 9-9 and 10-10 of FIG. 7.
Figure 9:
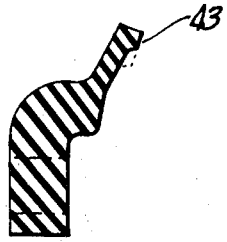
Figure 8:
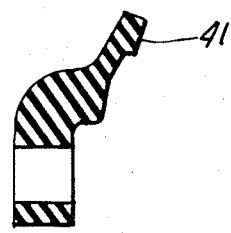

The three different shapes of the lip are shown in FIGS. 8, 9 and 10. FIG. 8 shows a broad surface 41 for use in the longitudinal sections 42 (FIGS. 6 and 7) of the seal; FIG. 9 shows a narrowed surface 43 taken approximately midway of the tapered section 44 of the seal, and FIG. 10 shows a sharp corner 45 or "zero" surface at the curved portion 46 of the seal between the tapered sections 44.

In view of the large size of the seal, it is preferable to construct the lip as well as the spring of relatively short sections which are subsequently joined together to produced the finished seal. Thus the straight portions of the lip may be molded in sections 24 inches long which are suitable bonded together, and the metal spring over the same portions may be a series of stampings of approximately the same length, i.e., 24 inches, which, however, need not be brazed or welded together. The semicircular ends of both the tip and spring are formed as single pieces.

The seal described above is particularly well suited for sealing an opening against an oscillating or reciprocating flat, curved irregular surface exposed to varying weather and corrosive environment. The molybdenum disulphide filled polytetrafluoroethylene sheet makes possible a substantial cost reduction for the gun shield through the use of less expensive materials such as cast iron, cold rolled steel, grey iron, etc., instead of the expensive monel, stainless steel and aluminum.

I claim:

1. The combination of a curved wall member and a curved surface oscillatable relative thereto about the axis of said surface, said wall member having a port opening upon said surface, and a flexible seal for said port at said surface, said port being elongated circumferentially of the surface such that it has substantially parallel sides and substantially semicircular ends connecting the substantially parallel sides, said seal having a continuous lip in contact with said surface, the region of said lip in contact with said surface being substantially flat at the substantially parallel sides to provide a broad contact thereat and sharp at the substantially semicircular ends to provide line contact over said ends, and means spaced from said lip for securing said lip to the wall member at the port.

2. A seal is described in claim 1, characterized in that a tapered surface is provided on the lip between the flat and sharp regions of the lip to provide a gradual transition therebetween.

3. A seal as described in claim 1, characterized in that a flange is provided on the wall member extending into said port in spaced relation to said surface, and said means spaced from said lip for securing said lip to the member comprising a continuous region on said seal overlying the flange, a clamping ring over said continuous region, and means securing the clamping ring, the continuous region and the flange together.

4. A seal as described in claim 3, characterized further by a spring clamped between said clamping ring and said continuous region said spring having resilient fingers extending over and bearing upon said lip to hold said lip in sealing contact with said surface.

5. A seal as described in claim 1, characterized in that said seal comprises an endless strip of molybdenum disulphide filled polyurethane and said surface comprises a sheet of molybdenum disulphide filled polytetraflouroethylene.